(12) United States Patent
Platis et al.

(10) Patent No.: US 8,277,311 B2
(45) Date of Patent: Oct. 2, 2012

(54) WAGERING WEB SERVICE SYSTEM AND METHOD

(75) Inventors: Harry Platis, Lynnwood, WA (US); Kristopher Michael Shannon, Bothell, WA (US)

(73) Assignee: Harry Platis, Mill Creek, WA (US)

( * ) Notice: Subject to any disclaimer, the term of this patent is extended or adjusted under 35 U.S.C. 154(b) by 515 days.

(21) Appl. No.: 12/472,344

(22) Filed: May 26, 2009

(65) Prior Publication Data
US 2010/0151935 A1    Jun. 17, 2010

Related U.S. Application Data

(60) Provisional application No. 61/122,364, filed on Dec. 13, 2008.

(51) Int. Cl.
*A63F 9/24* (2006.01)
(52) U.S. Cl. .......................................... 463/25
(58) Field of Classification Search .................. None
See application file for complete search history.

(56) References Cited

U.S. PATENT DOCUMENTS

| | | |
|---|---|---|
| 5,374,060 A | 12/1994 | Goldberg |
| 5,564,977 A | 10/1996 | Algie |
| 5,746,657 A | 5/1998 | Ueno |
| 5,749,785 A | 5/1998 | Rossides |
| 5,830,068 A | 11/1998 | Brenner et al. |
| 5,873,782 A | 2/1999 | Hall |
| 5,957,775 A | 9/1999 | Cherry |
| 6,004,211 A | 12/1999 | Brenner et al. |
| 6,089,981 A | 7/2000 | Brenner et al. |
| 6,099,409 A | 8/2000 | Brenner et al. |
| 6,120,376 A | 9/2000 | Cherry |
| 6,236,900 B1 | 5/2001 | Geiger |
| 6,280,324 B1 | 8/2001 | Tenenbaum |
| 6,309,307 B1 | 10/2001 | Krause et al. |
| 6,347,086 B1 | 2/2002 | Strachan |
| 6,358,150 B1 | 3/2002 | Mir et al. |
| 6,383,074 B1 | 5/2002 | Boggs |
| 6,450,887 B1 | 9/2002 | Mir et al. |
| 6,508,709 B1 | 1/2003 | Karmarkar |
| 6,544,121 B2 | 4/2003 | DeWeese et al. |
| 6,554,708 B1 | 4/2003 | Brenner et al. |
| 6,554,709 B1 | 4/2003 | Brenner et al. |
| 6,688,978 B1 | 2/2004 | Herman |

(Continued)

OTHER PUBLICATIONS

NTRA Wagering Technology Working Group/Giuliani Partners LLC, "Improving Security in the United States Pari-Mutuel Wagering System: Status Report and Recommendations", Aug. 2003, accessed Jun. 16, 2008, <http://www.ntra.com/contenUWTWG_final_report.pdf>.

(Continued)

*Primary Examiner* — Ha Tran T Nguyen
*Assistant Examiner* — Vongsavanh Sengdara
(74) *Attorney, Agent, or Firm* — Matthew Jellett

(57) ABSTRACT

A system to coordinate a wagering event using a virtual Web server with an administration application and a server database. The administration application is executable code which can generate a first event page from an event category page. The administration application also has a player management page, a pool page and a ticket management set of pages. The administration application interoperates with a banking application and a casino application. The administration application will send the event information to the casino application, receive wager information from the casino application, coordinate wager amounts with the banking application, close the wagering, monitor the event, update pool, close the pool, and allocate the winnings and losses.

34 Claims, 10 Drawing Sheets

U.S. PATENT DOCUMENTS

| | | | |
|---|---|---|---|
| 6,695,701 B2 | 2/2004 | Aronson et al. | |
| 6,712,701 B1 | 3/2004 | Boylan, III et al. | |
| 6,786,824 B2 * | 9/2004 | Cannon | 463/42 |
| 6,811,488 B2 | 11/2004 | Paravia et al. | |
| 6,837,789 B2 | 1/2005 | Garahi et al. | |
| 6,837,791 B1 * | 1/2005 | McNutt et al. | 463/42 |
| 6,910,965 B2 | 6/2005 | Downes | |
| 7,070,499 B2 | 7/2006 | Ocampo | |
| 7,094,151 B2 | 8/2006 | Downes | |
| 7,172,508 B2 | 2/2007 | Simon et al. | |
| 7,311,606 B2 | 12/2007 | Amaitis et al. | |
| 7,452,274 B2 | 11/2008 | Amaitis et al. | |
| 7,510,116 B2 | 3/2009 | Robb et al. | |
| 7,742,972 B2 | 6/2010 | Lange et al. | |
| 7,775,880 B2 | 8/2010 | Downes | |
| 7,942,735 B2 | 5/2011 | Meyer et al. | |
| 8,142,279 B2 | 3/2012 | Benrus | |
| 2004/0029627 A1 | 2/2004 | Hannan et al. | |
| 2004/0198483 A1 | 10/2004 | Amaitis et al. | |
| 2004/0204245 A1 | 10/2004 | Amaitis et al. | |
| 2004/0229675 A1 | 11/2004 | Cannella | |
| 2005/0064934 A1 | 3/2005 | Amaitis et al. | |
| 2006/0252520 A1 * | 11/2006 | Platis | 463/28 |
| 2007/0026940 A1 | 2/2007 | Cannella | |
| 2007/0197281 A1 | 8/2007 | Stronach | |
| 2008/0248846 A1 | 10/2008 | Stronach et al. | |
| 2008/0274796 A1 | 11/2008 | Lube | |
| 2009/0036204 A1 | 2/2009 | Amaitis et al. | |
| 2009/0088232 A1 | 4/2009 | Amaitis et al. | |
| 2009/0186691 A1 * | 7/2009 | Pau | 463/25 |
| 2010/0029370 A1 | 2/2010 | Robinson et al. | |
| 2010/0203950 A1 | 8/2010 | Frick | |
| 2010/0298043 A1 * | 11/2010 | Bytnar et al. | 463/24 |
| 2010/0304850 A1 | 12/2010 | Gelman et al. | |
| 2011/0111841 A1 * | 5/2011 | Tessmer et al. | 463/25 |
| 2011/0256922 A1 | 10/2011 | Amaitis et al. | |
| 2012/0041819 A1 | 2/2012 | Ramer et al. | |
| 2012/0077571 A1 | 3/2012 | Amaitis et al. | |

OTHER PUBLICATIONS

PCT/ISA/210 International Search Report for PCT/US05/30568, 10 pages.

PCT/ISA/237 Written Opinion of the International Searching Authority for PCT/US05/30568, 13 pages.

* cited by examiner

FIG. 4

WAGERING WEB SERVICE SYSTEM AND METHOD

RELATED APPLICATIONS

This application incorporates U.S. patent application Ser. No. 11/215,633 filed Aug. 29, 2005 and U.S. Provisional Patent Application Ser. No. 61/122,364 filed Dec. 13, 2008 by reference in their entireties.

BACKGROUND

Totalisator Systems consist of networks of computers and wagering terminals linked by modems and frame relay systems which electronically combined wagers into "pools." Based on pool totals, the system records and displays changes in betting patterns and recalculates parimutuel odds and projected payoffs in timed intervals. Odds are established based on the proportion of money wagered into the pool on each horse. Odds change throughout the course of the wagering cycle and only become final when the wagering pool was closed at the start of the race. When the race results of a race are official, the system calculates payoffs on all winning wagers and betters can collect winnings. Present state-of-the-art systems operate on the intertote system protocol (ITSP), which is adapted from its original use in inter-track, intratote wagering on live races at individual facilities to support extensive inter-track, interstate, and intertote wagering on simulcasts (such as closed-circuit televisions).

The present intertote system protocol has two main functions: translation of wagering data into uniform computer language and data transportation. It supports a summation of bets or wagers per wagering combination on a per-pool, per-race basis and enables post event analysis of wagering data. When the system is in a non-wagering mode, for data to be examined the records must be retrieved manually from backup tapes. The system as present does not enable the transfer of wagers themselves to the host site or the combination of actual data across systems, which if it were provided, would aid in the real-time detection of wagering irregularities.

ITSP transmits wagering data serially, so that each bit of electronic data must remain in precise order throughout the transfer process in order for the data to be retrieved successfully. If transmission interruptions occur or data is lost, manual procedures must be implemented to merge wagering information back into the data stream.

The ITSP system functions on bandwidth that sustains data transmission speeds ranging from 2.4 Kb per second to 19.2 Kb per second. Delays are observed in posting of final odds, the amount of time it takes for the system totes to collect, process, and merge data from hundreds of sources into the host betting pools and trigger a new round of parimutuel odds which delay is largely a function of the ITSP limited bandwidth.

With regard to security controls for the parimutuel wagering system, the primary control of security exists at the level of the Totalisator company. Generally, each company provides proprietary security programs, policies, response procedures and managerial controls to respond to security incidents. The policies are not uniform across all companies. Generally, contracts for tote services and for simulcasting provide cross-company security standards.

With regard to regulatory control, parimutuel wagering largely takes place at the state level. Racing commissions are the licensing entities for horseracing and are statutorily authorized to enforce the rules of parimutuel racing and wagering. Regulations vary between jurisdictions as to levels of regulatory control. To create additional symmetry between the state regulatory associations, a joint model rules of racing developed by the NAPRA and RCI are proposed to incorporate enhanced guidelines for wagering security.

With regard to verifying and reviewing tickets and determining if they are either winning or fraudulent verification can be difficult. In some cases paperless wagers are made at remote locations, within or outside the United States, so that verification of the wagering specifics (for example via audio or digital tapes) involves the cooperation of multiple parties (for example host track, the tote company, a US wagering hub, the hubs tote company, and the off-track betting facility or wagering account service and it's tote company). In some cases, the data tapes must be pulled and reviewed by relevant staff for each wagering event to verify the ticket. See the August 2003 report on *"Improving Security in the United States Parimutuel Wagering System: Status Report and Recommendations"* presented by the NTRA wagering technology working group in conjunction with Giuliani partners LLC.

BRIEF DESCRIPTION OF THE DRAWINGS

FIG. 4 is a plan view of the events page.

DESCRIPTION OF THE PREFERRED EMBODIMENTS

Figure 1:
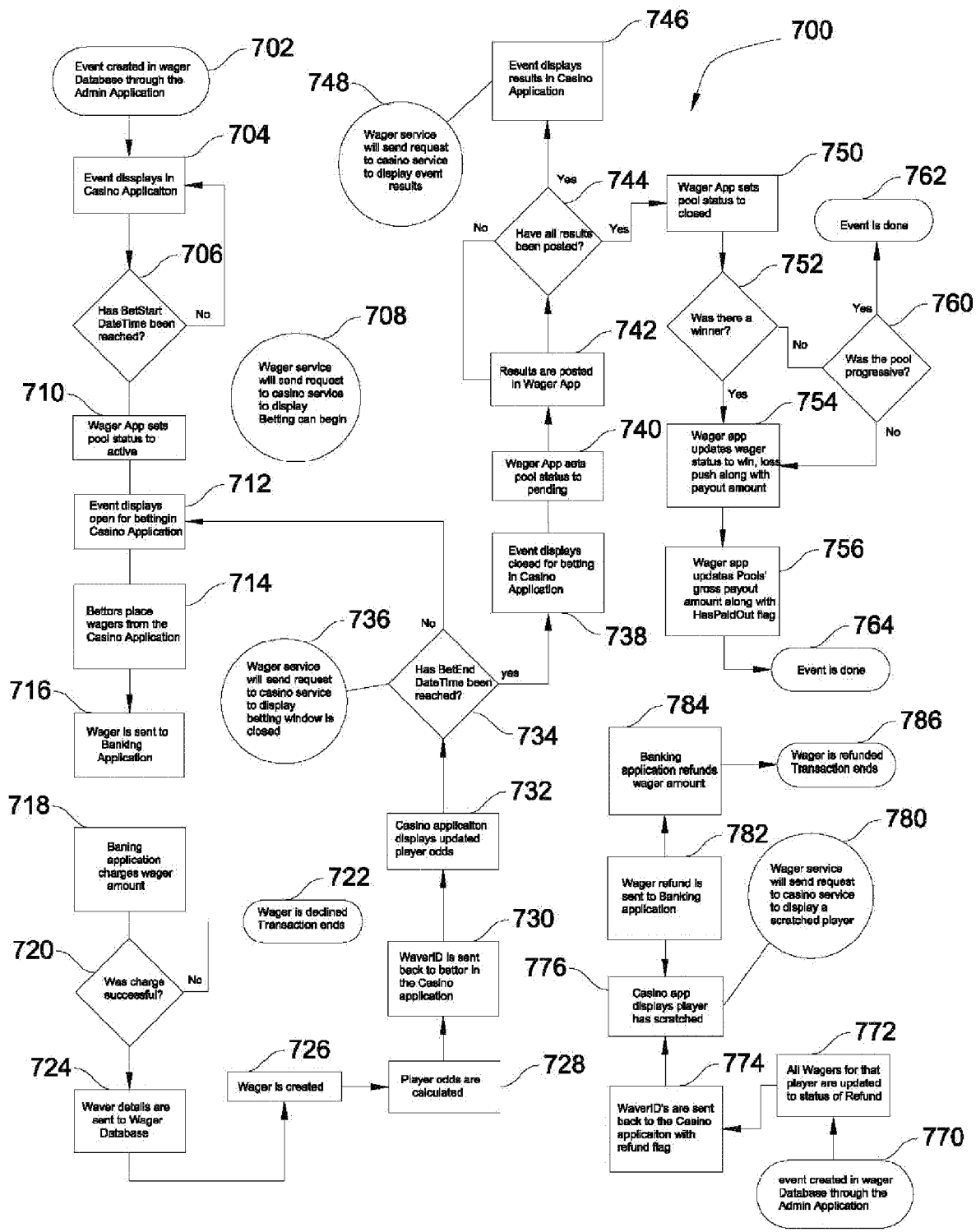
FIG. 1 is a flowchart of the wagering web service.

The present embodiment provides a wagering web service which operates on a wagering web virtual server and coordinates wagering on events such as tournaments, wagering on entrants in such events, wagering event-location applications and databases (such as casino applications and their related databases), financial institutions (such as bank applications and databases), and the individual wagering events themselves (such as various types of wagering scenarios, for example a win bet, a choose n to win, (wagering on large entrant groups) etc. . . . )

The wagering web service acts to synthesize and coordinate the disparate applications to create a Virtual Totalsator System. This Virtual Totalsator System utilizes a scalable technology platform and encrypted communication channels to provide a secure Web service. The service utilizes in one embodiment a Web Service Definition Language or WSDL. The Web service method interfaces and interacts with the various databases discussed above utilizing a Simple Object Access Protocol or SOAP to exchange the structured information regarding the transactions. The protocol utilizes XML as its message format.

The bandwidth limitations are only limited to the local portals within which the end transactions are taking place. With regard to security controls, the primary control of security exists at the wagering Web service administration application location, and shares security with each of the locations, for example at the event locations, financial locations, and at the wagering locations. Therefore, security is shared disparately between each location and provides a separation of information. With regard to regulatory control, the pari-mutuel wagering takes place at the local level, and the wagering web service administration can take place off-site because no wagering is taking place there.

With regard to verification of tickets and IDs, the system uses a GUID regime which provides for near unique ticket ID generation. While each generated GUID is not guaranteed to be unique, the total number of unique keys 2 to the 128th or 3.4×10 to the power 30, is so large that the probability of the same number being generated twice is extremely small.

A more detailed discussion of the present system will now be provided. The present system provides a scalable technology platform, which enables the development of a centralized database of wagering information, as well as provides an encrypted communication channel for interaction with a secure web service which utilizes WSDL for the web service method interface and interaction with the database via SOAP. Furthermore, the client/system authentication uses public-key encryption where authorized systems, kiosks or websites can communicate with the web service. Additional data integrity includes the use of advanced data validation to ensure the integrity of the data through the lifecycle of the system and a transactional database enables every action taken against the database be rolled up into a transaction where it can then be rolled back for prevention of data loss as well as review of actions which occur during the wagering processes.

With regard to encryption, all communications are provided with internal systems encrypted via RSA 128 bit public-key encryption which prevents the cashing of unclaimed winning tickets. Each ticket ID is based on a unique ticket identification and is generated as a GUID where the GUID is a 16 byte 128 bit random identifier. The GUID or globally unique identifier is a special type of identifier used in software applications in order to provide a reference number which is unique in any context. For example, in defining the internal reference of a type of access point in the software application, or for creating unique keys in the database, the GUID provides a unique reference number for these purposes. While each generated GUID is not guaranteed to be unique, the total number of unique keys 2 to the 128th or 3.4×10 to the power 30, is so large that the probability of the same number being generated twice is extremely small. As an example, consider the observable universe, which contains about five to the 10 power 22 stars; every star could then have 6.8×10 to the 15 universally unique GUIDs. The term GUID generally refers to Microsoft's implementation of the universally unique identifier or (UUID) standard. Many systems use the term GUID, including Oracle Database, my SQL, DBase, OpenView Operations, ISIS Papyrus, and Novell E Directory. The GUID is also the basis for the GUID partition table, Intel's replacement for master boot records under EFI.

In addition, the present system provides clear authentication of each request which is sent to the web service in order to successfully pass data from one component of the system to another component of the system, for example coordinating the data request from a bank client location to a casino client location.

Generally speaking, the present system integrates client applications and provides a modular and extensible architecture. The client applications do not communicate with the database directly and are transacted through the intermediate web service thus providing the modularity required for creating the scalable platform. In addition, web services utilize open architecture which allows for any system, device, or websites to interact with the web service as long as it has the ability to communicate with the web service via XML and/or SOAP thus providing the extensibility required for enabling the system within different environments.

The present system can be ported to various use scenarios as previously discussed in the parent applications. For example, the World Series of Poker or any event can be offered through x-named players and one or multiple field bets. Additionally, the final table pick with an (n) order of finish can be chosen. A March Madness/NCAA Basketball tournament can be provided utilizing a final 2, final 4, or elite 8 pools or the entire 64 tournament team pool. Mobile wagering within land-based casino operations utilizing a handheld device or smart phone, as well as networking multiple land-based casinos into large "jumbo" wagering pools.

The present system also provides additional flexibility over the traditional totalisator systems. This includes event independent feature, configurable wagering pools, and the ability to pick "n" number of entrants within the event to place or win in any particular order. For example, as previously discussed in the U.S. patent application Ser. No. 11/215,633 filed Aug. 29, 2005, the event independent features include a system where any event types such as poker, billiards, tennis, golf, basketball with multiple entrants or large number of entrants within the fields can be wagered upon. The configurable betting pools offer features such as commissions, minimum and maximum wager amounts, mandatory payouts, progressive or win/lose pools, maximum number of wagers, all defining various winning criteria from a win bet to pick (n).

Figure 2:
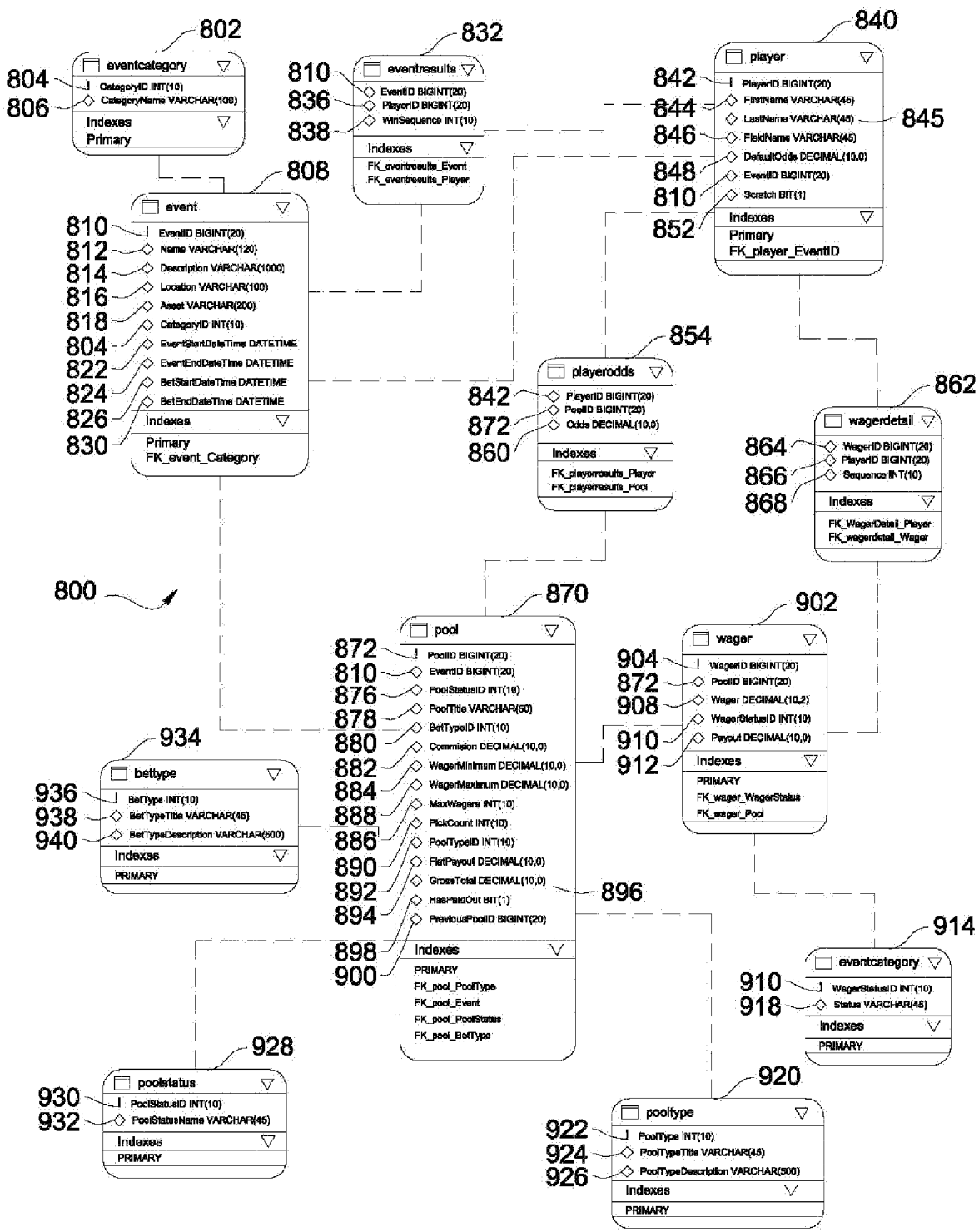
FIG. 2 as a schematic detail of the database.
Figure 5:
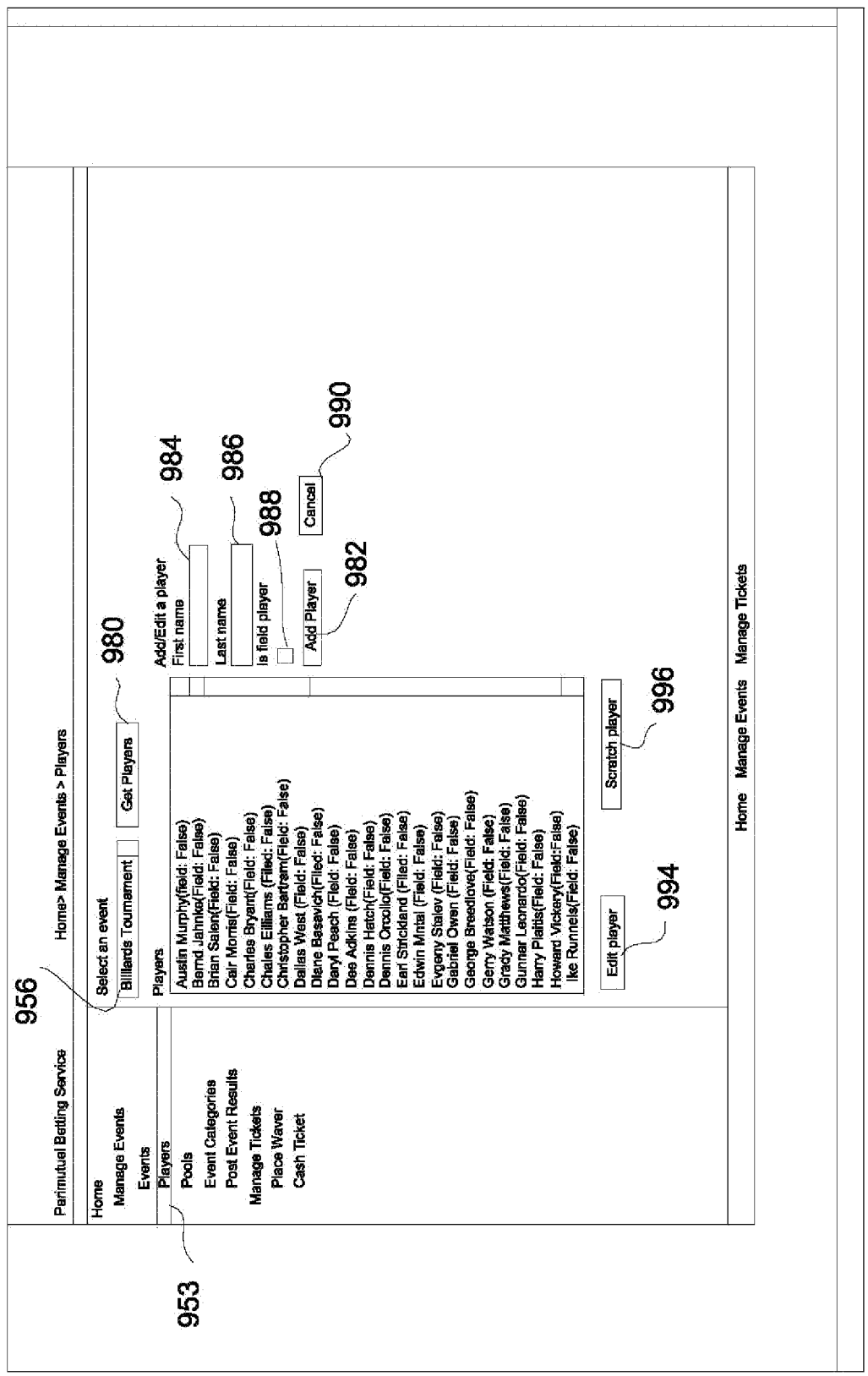
FIG. 5 is a plan view of the players page.

This is in alternative embodiment to the wagering application 42 as seen in FIG. 5. U.S. patent application Ser. No. 11/215,633 filed Aug. 29, 2005. The main focus of this particular embodiment is in providing the wagering backend application 84 to coordinate the parimutuel wagering events between the various parties. Additionally, get information and add information events are posted and returned for coordination of the casino applications 34 the banking applications 38 and the clients 12 as seen in FIGS. 1 and 2 of U.S. patent application Ser. No. 11/215,633 filed Aug. 29, 2005.

The wagering web service method 700 as seen in FIG. 1 utilizes in this particular embodiment XML requests and responses. This wagering web service method 700 operates on the wagering web service database 800 as seen in FIG. 20 which utilizes a relational database and a transactional database such as MySQL server and as previously discussed interacts with the database via SOAP and includes WSDL method definitions for interface with the database.

Figure 3:
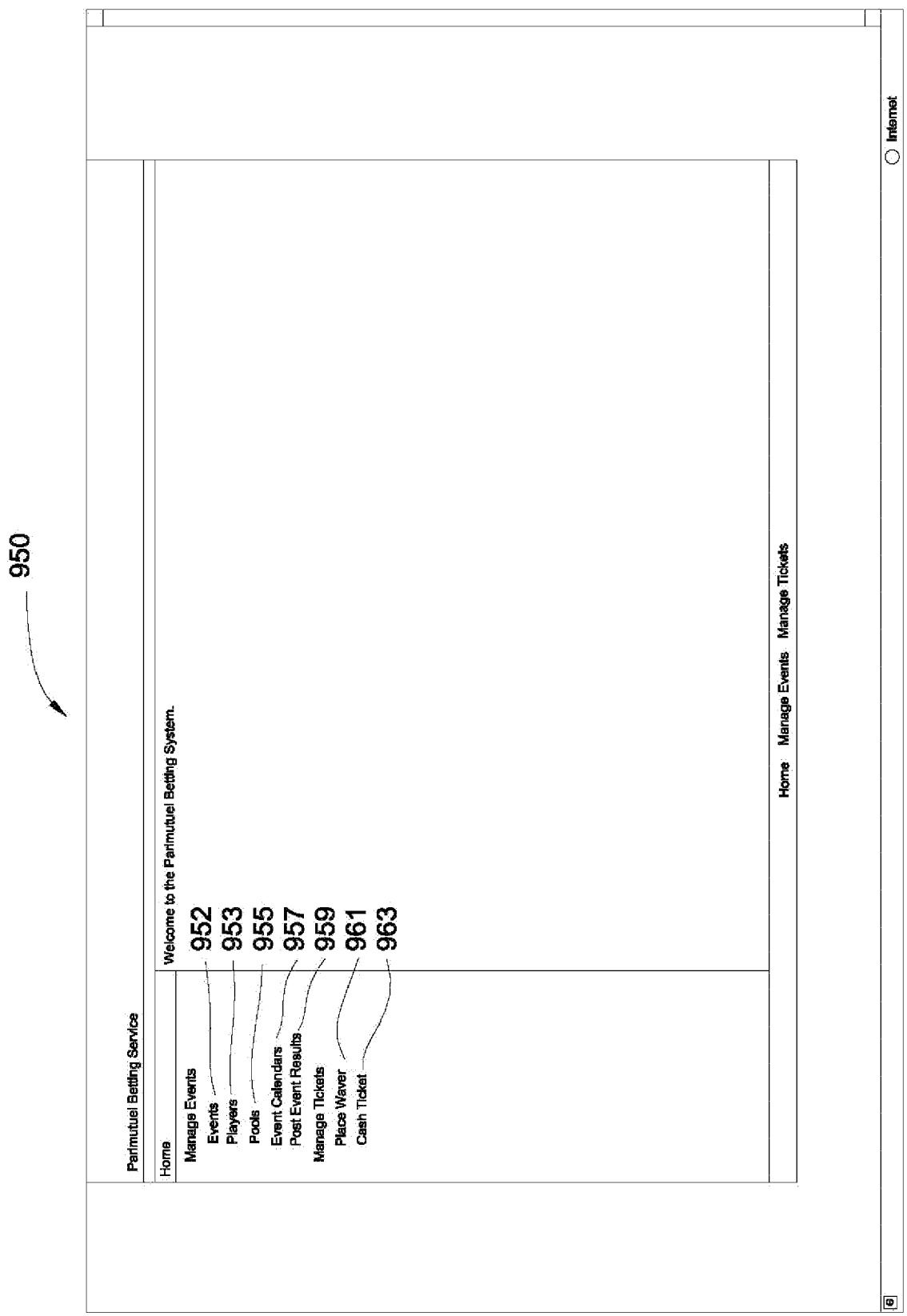
FIG. 3 is a plan view of the wagering web service home page.

A discussion of the wagering web service method 700 will be provided followed by a detailed discussion of the database 800 and then an implementation will be discussed in FIGS. 3 through 10 of the wagering web service 950 as seen in FIG. 3 implementing the web service wagering application.

Referring to FIG. 1, the wagering web service method 700 utilizes a number of steps which can be broken into discrete parts but which will be talked in total here in the present embodiment. Before the wagering web service can host an event, the user must create an event in the wager database through the wagering web service system application 950 at step 702. Once the event is created the event is displayed in the casino application 34 (see FIG. 2 of U.S. patent application Ser. No. 11/215,633) at step 704. The system then checks to see if a bet start date and time has been reached at step 706. In order to determine this, the wagering service will send a request to the casino application or service 34 to display whether or not betting can begin at step 708. If the bet's start date and time has not been reached, the event continues be displayed in the casino application 704. If it has been reached, then the wagering application or wagering service 950 and/or wagering application 42 in FIG. 5 of U.S. patent application Ser. No. 11/215,633, will set the pool to active status at step 710.

With the pool set to active status, the event is displayed as being open for betting in the casino application at step 712. During this time, individuals at the casino application or in a location where individuals can wager legally, can place a wager from the casino application client computer at step 714. The wager is sent to the banking application at step 716 and the wagering service requests from the either banking application or the casino application if the charge was successful at step 720. If not, the wager is declined and the transaction ends at step 722. If the charge was successful than the wager details are sent to the wagering database 800 or wagering database 40 (see FIG. 5 of U.S. patent application Ser. No. 11/215,633) at step 724. The wager is created at step 726 in the wagering web service system 950 or in other words the wagering application 42 (see FIG. 5. of U.S. patent application Ser. No. 11/215,633). Once the wager is created, player odds are calculated at step 728.

Figure 6:
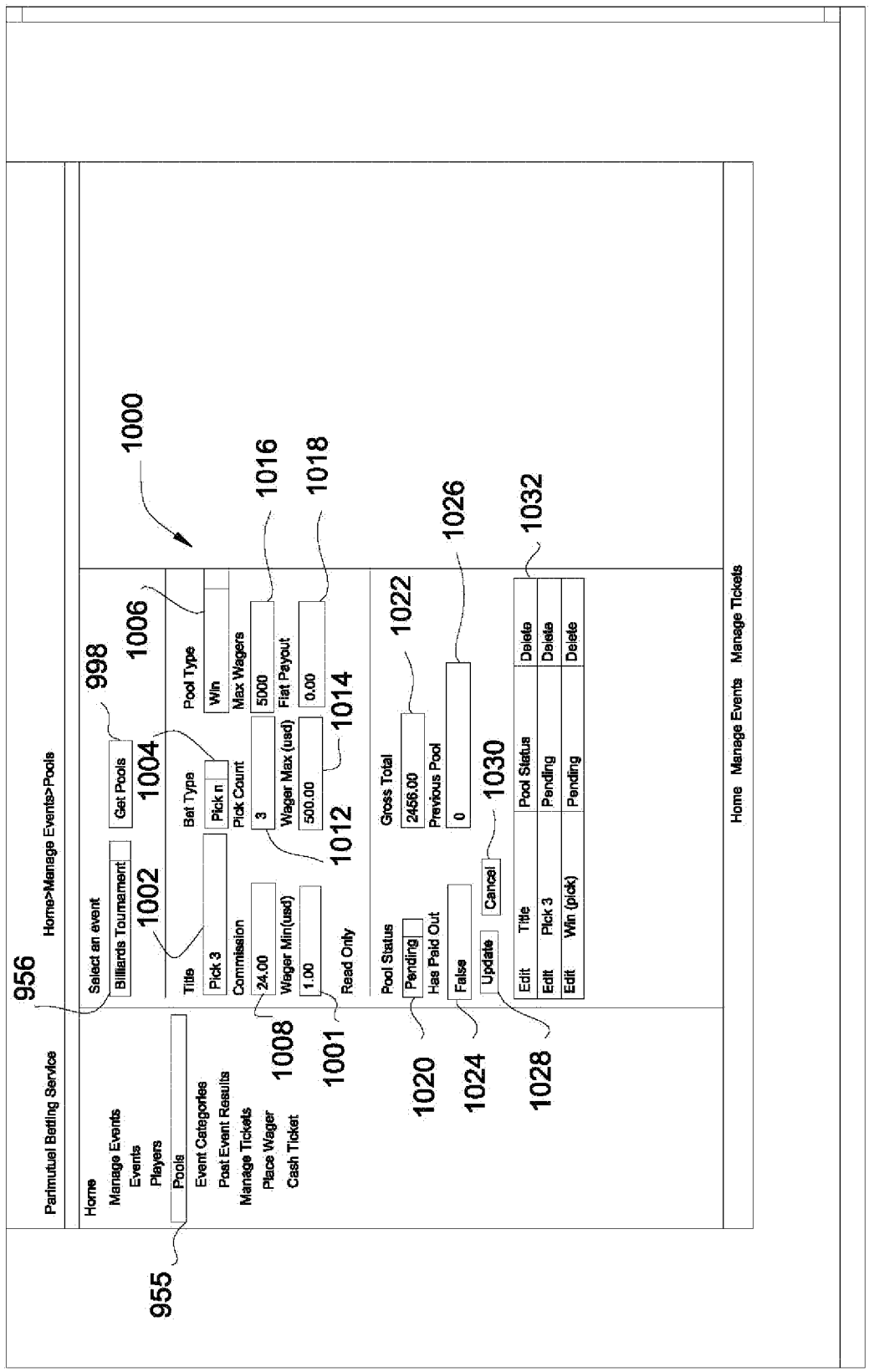
FIG. 6 is a plan view of the polls page.
Figure 10:
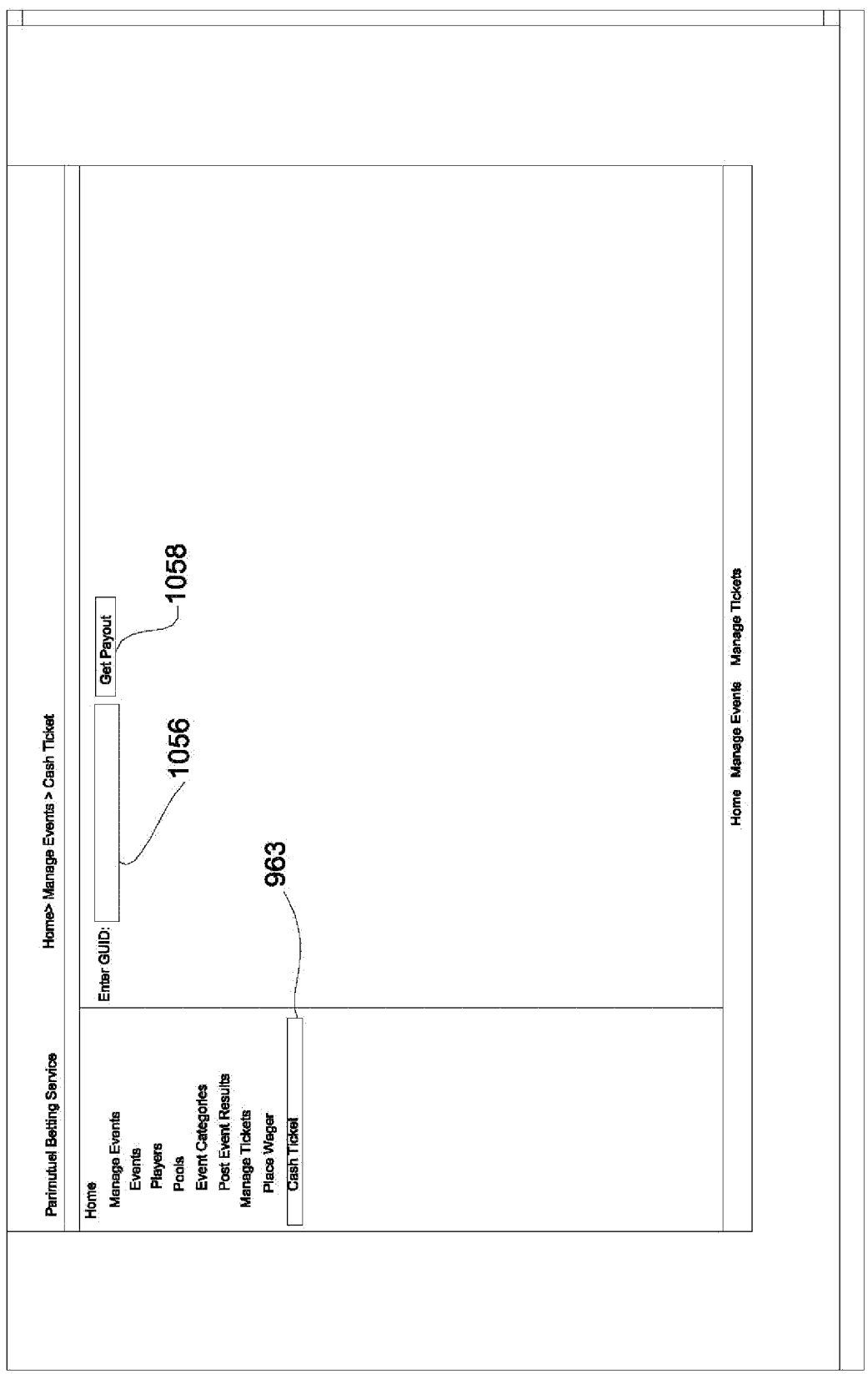
FIG. 10 is a plan view of the ticket page.

One way of calculating player odds at step 728 steps is to use the previously discussed method of calculating odds for large pools in parimutuel wagering on a large number of entrants as seen in FIG. 11 A of U.S. patent application Ser. No. 11/215,633 where the set bet types 98 or bet set that pools 110 as seen in FIG. 6 of U.S. patent application Ser. No. 11/215,633 or later on discussed below as web methods for calculating player odds in the player odds web method 854 as seen in FIG. 3. The wager is created and a wager ID which is a GUID ID 1056 as seen in FIG. 10 is sent back to the bettor in the casino application at step 730 and a ticket is generated either electronically or by paper utilizing a relational or the actual GUID ID so that the individual wagering has a ticket in hand to present to the ticket office when redeeming his or her winnings. This is a unique ticket that is only generated once. It is generated either through standard printing means, or maybe generated electronically and provided to the individuals cell phone or PDA or client laptop computer or desktop computer.

The web service then returns to the casino application the updated player odds which the casino application displays at step 732. The casino application continues to poll the web service to determine if the bet end date and time have been reached at step 734. This occurs when at step 736 the wager service sends a request to the casino application to display the betting window has been closed. When the event being displayed is closed for betting or wagering in the casino application at step 738, then the web service sets the pool status to pending at step 740. This is when the wagering stops and the play begins within the particular event such as the poker tournament as previously mentioned in the parent application or billiards tournament etc.

The results are then posted in the web service application at step 742 and once all results have been posted at step 744 the web service sends the casino application the event results at step 746. The wagering web service will send a request to the casino service to display the event results at step 748. Then the wagering application or web service sets the pool status to close at step 750 and the web service determines if there was a winner at step 752. If there was no winner, the web service determines if the pool was a progressive pool at step 760. If the progressive pool was active, then the event is complete at step 762. If there was a winner at step 752 or there was no progressive pool, the wagering application/web service updates the wager status to win, loss, or push along with payout amount at step 754.

The web service wager application updates the pools and gross payouts amount along with an indication of having paid out through the use of the flag of some sort at step 756. The event is complete at step 764 and the web service then returns to a waiting state for either another event to be created, another bet start date and time to be reached, or another bet and date time to be reached for beginning of another competition.

Still referring to FIG. 1, if a player is scratched or taken out of the tournament or competition for whatever reason, the web service application at step 770 will then refund at step 772 all wagers for that player and the odds are then updated. New wager ID's as previously discussed GUIDS, are sent back to the casino application with a refund flag at step 774. The casino application displays the scratched player at step 776, the wager service sends a request to the casino application to display the scratched player step 780, a wager refund is sent to the banking applications of 782, and the banking application refunds the wagering amount at step 784.

Now referring to FIG. 2, discussion of the wagering database 20 which supports with the wagering web service methods will be provided. The wagering web service database 800 keeps track of the events, players, pools, wagers or bet types, status of the wagers and pools, and the coordination of this information between the casino application, banking application, and the individual wageror either at the casino or at a licensed location.

In discussing FIG. 2, reference will also be made to the wagering web service application 950 which shows some administrative features of the site as seen in FIGS. 3 through 10.

Figure 7:
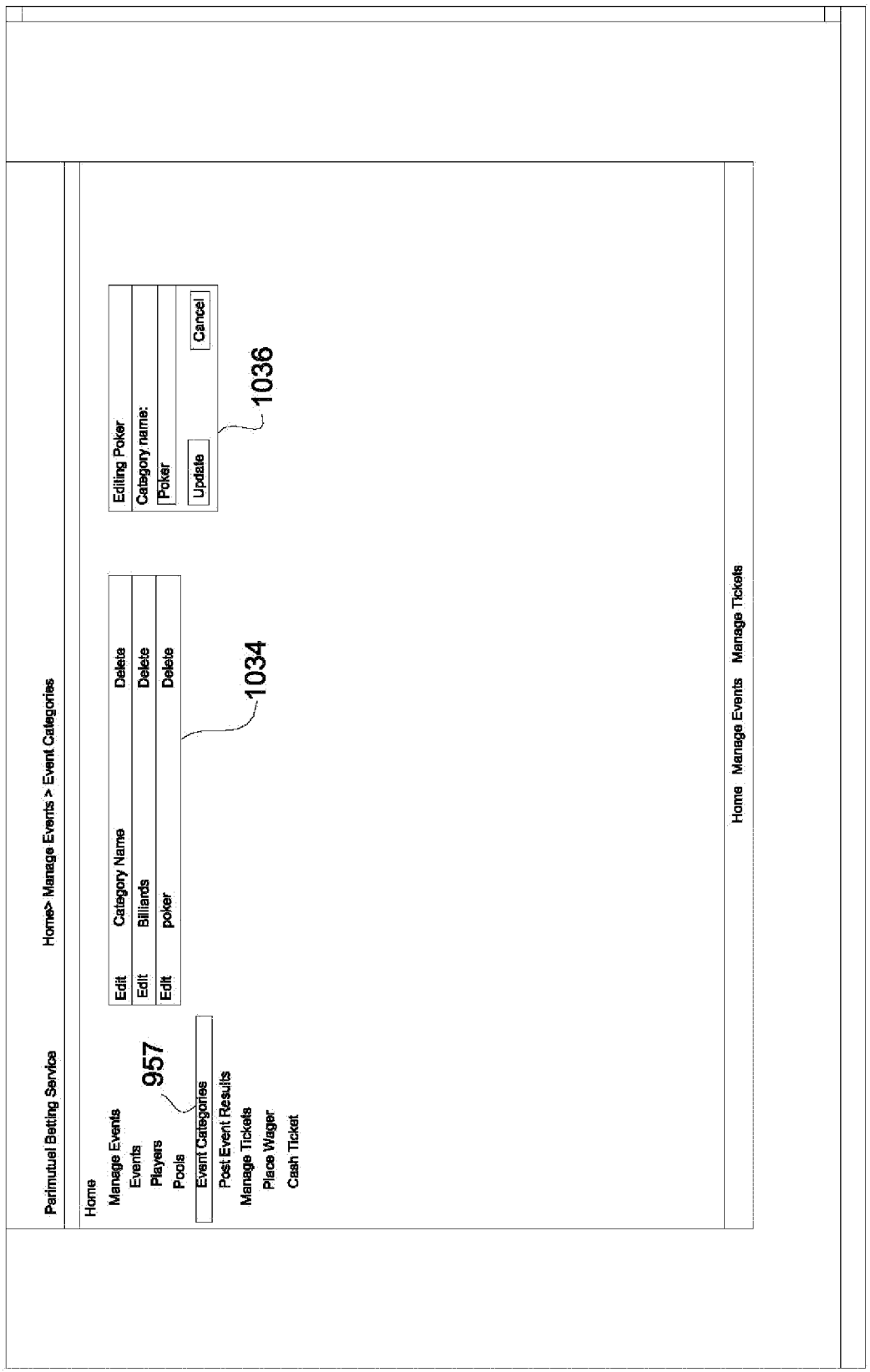
FIG. 7 is a plan view of the event categories page.

The wagering web service database 800 (FIG. 2) can be hosted on a single server or multiple servers with mirroring of the database for security and access purposes. The wagering web service database includes an event category object 802. The event category object 802 correlates with the event categories page 957 as seen in FIG. 7. The administrator can create various categories, or in other words, types of events such as the previously discussed events in the parent applications like, poker tournaments, basketball tournaments, billiards tournaments, marathons, etc. where the administrator can create a category name 1034 which correlates to the category name object 806, which is accounted with a category ID 804. The administrator can enter in the category names in a category name field 1036. The administrator can edit, delete, update, or cancel the various category names.

Figure 4:
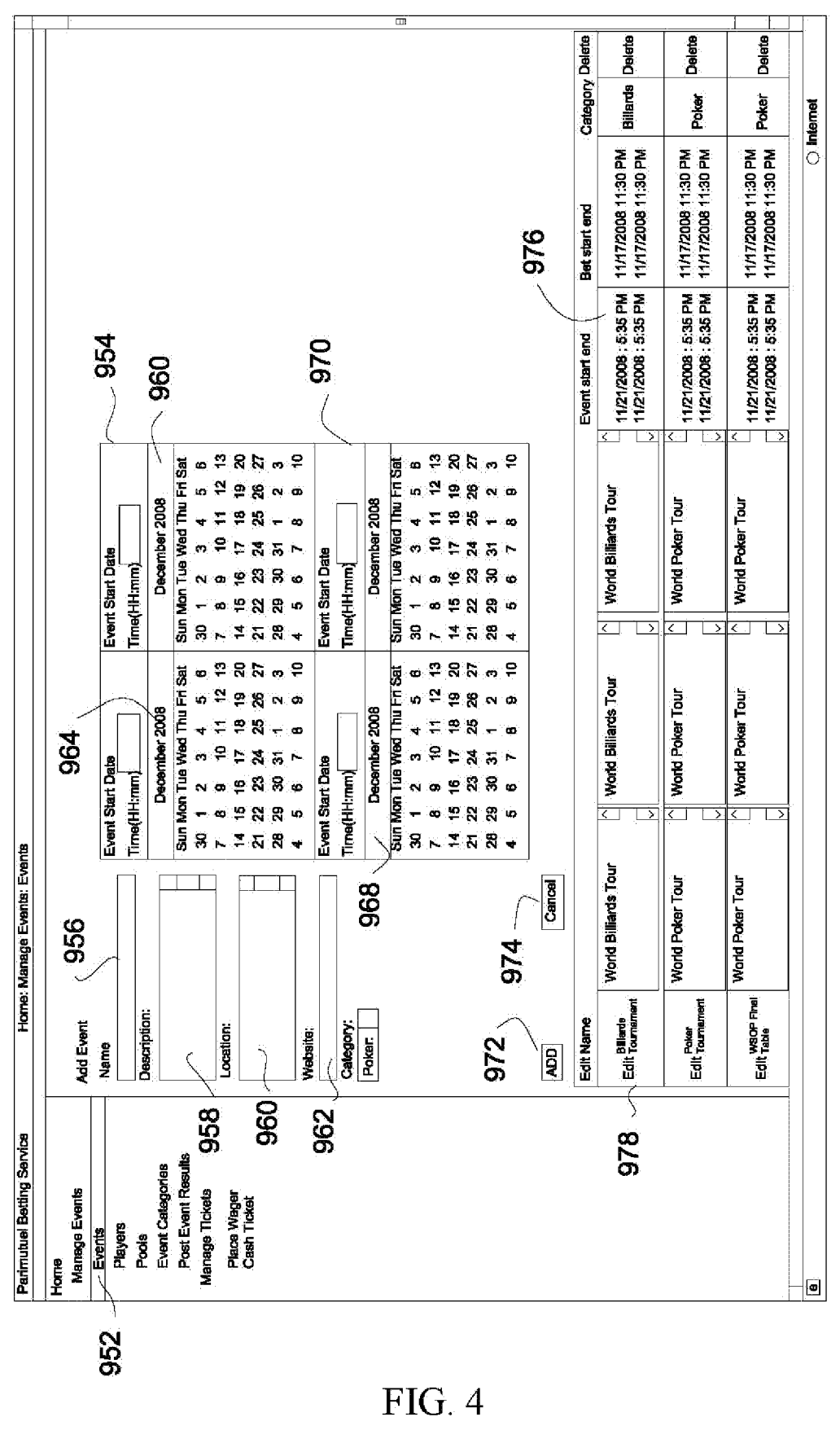

Depending upon the categories themselves are events, where the events are actual contests or tournaments which are either played in real time at a physical location or at a virtual location. These events are organized by category and the event page 952 as seen in FIG. 4 draws from a series of objects in the event object class 808. When a new event is created, an event ID 810 is assigned. The administrator can enter by adding an event at the add component 972 and in doing so creates a series of available fields for the add event component 954. The add event component includes a field for entering the name at field 956 which correlates to the name object 812 which is the name of the event.

A description field 958 correlates to a description object 814 within the database a location field 960 correlates to a location object 816 in the database where the location is the physical or virtual location where the event is happening.

The website field 962 correlates to the asset object 818 in the database. The asset object and asset fields allow the administrators to enter in the particular website or URL where the tournament is located or the event is located. To assign a category to a particular event, a category pull down menu is provided which correlates to the category ID 804 in the category or the event category object 802.

The administrator can select an event start date from an event start date object 964 which is correlated to a database object in the event object 808 which is the event start date time object 822. The event end time component 966 will ask the administrator to choose an ending time for the event which includes the date time in hours and minutes. This component is correlated to an event end date time object 824 in the database.

One can also set the bet start date end time in field 968 which is correlated to the bet start date time object 826 in the event object as well as enter the betting end date and time information in field 970 which correlates to the bet end date time object 830 in the database.

Once the administrator enters in this information, it is reflected in the event management fields 978 which are displayed in the event page 952 for monitoring and quick reference.

With the event category and the event itself established, a number of additional objects and software components are ready to obtain and/or display information. They include the event results object 832 which correlates to the event results page 959 as seen in FIG. 3, the player object 840 which correlates to the players page 953 FIG. 3, the pool object 870 which correlates to the pool page 955 FIG. 3, and then additional objects extend from these secondary object pages to be discussed further below.

Referring to FIG. 5 and in conjunction with a discussion of the player object 840 FIG. 2, the wagering web service 950 can either get players, edit players, or add players to a selected event. The players' page 953 allows the web service to either receive or send the player information from the casino or event application/location dynamically through the XML service or the administrator can enter in manually the players themselves which are then affiliated with a particular event. If acquiring the player information dynamically through an XML feed, the administrator may select the event name 956 and then choose the get players component/button 980. This will then load the player names which include a first name object 844, a last name object 845, as well as a field designation 846. The players are correlated to the particular event ID object 810 and each of the players is assigned a player ID object/account number 842. If a player, for example, has defaulted or scratches then the player is flagged with the scratch object 852.

In the player page 953, the players once they are loaded into the database, are shown in a players' field 992. Here the administrator can edit the player utilizing the edit player component 994, add additional players 982, indicate whether the player is in the field at 988, add or edit the player's first and last names in the fields 984 and 986, as well as cancel the player at 990.

Before the event begins and before the betting or wagering phase of the process, the wagering pools must be established so that individuals who wish to wager on a particular contest can do so. Referring to FIG. 6, discussion of the wagering pool page 955 will be provided in conjunction with reference to the database pool object 870 FIG. 2. The pools can be established either administratively at the wagering web service site or can be established at the event host sites such as the casino or tournament location. Furthermore, a third site unaffiliated with the casino location hosted on a remote computer may be used depending upon the configuration requirements. In order to receive the pool information from a remote location, the get pools component 998 allows the administrator to upload via the XML feed, the pool settings for a particular event or named event 956 selected in the selecting location. The pool can be named in the title field 1002 which correlates to the pool title object 878 in the database.

When the pool is created, a pool status ID object 876 is assigned. The pool page and object has a bet type object 880 which is correlated to the bet-type selector 1004. This selector allows the wagering web service to choose the type of winning ticket. For example, picking either a single individual or entrant to win the contest, or choosing a number of entrants (n) to win in any order or in a particular order within the event or contest. Depending upon the bet type, a pool type 1006 can either be a win or a mandatory payout within the set pool types fields 1000 of the pools' page 955. The pool type 1006 correlates to the pool type object 892 in the database.

Also within the set pool types 1000 section is a commission field 1008 which correlates to a commission object 882 in the database. If the pick (n) bet-type 1004 is chosen, then the administrator can choose the number of pick counts in the pick count field 1012 which correlates to the pick count object 890 in the database.

This pick count field enables the administrator to choose the number of individuals or entrants within a particular contest or event to place in any order or place in a particular order depending upon how the particular rules are set for the wager, up to the number of entrants within the field. The administrator can also enter a maximum wagers amount within the max wagers field 1016 correlates to the wager maximum object 886 in the database. The minimum wager field 1010 correlates to the wager minimum object 884 in the database.

The wager max field 1014 correlates to the wager maximum object 888 in the database. The administrators can also choose a flat payout field 1018 which correlates to a flat payout object 894 in the database.

The service allows the pool page 955 to display the pool status and pool status field 1020, the gross total number of wagers in the gross total field 1022 whether the pool has paid out in either true or false in field 1024 and whether or not this was a previous pool in field 1026. These also correlate to the database objects including the gross total object 896, the paid out object 898, and the previous pool ID object 900. The administrators can update at 1028 and cancel at 1030 as desired, and can also display the current active/closed pool types within the pool type field display 1032 for each particular selected event 956.

Figure 9:
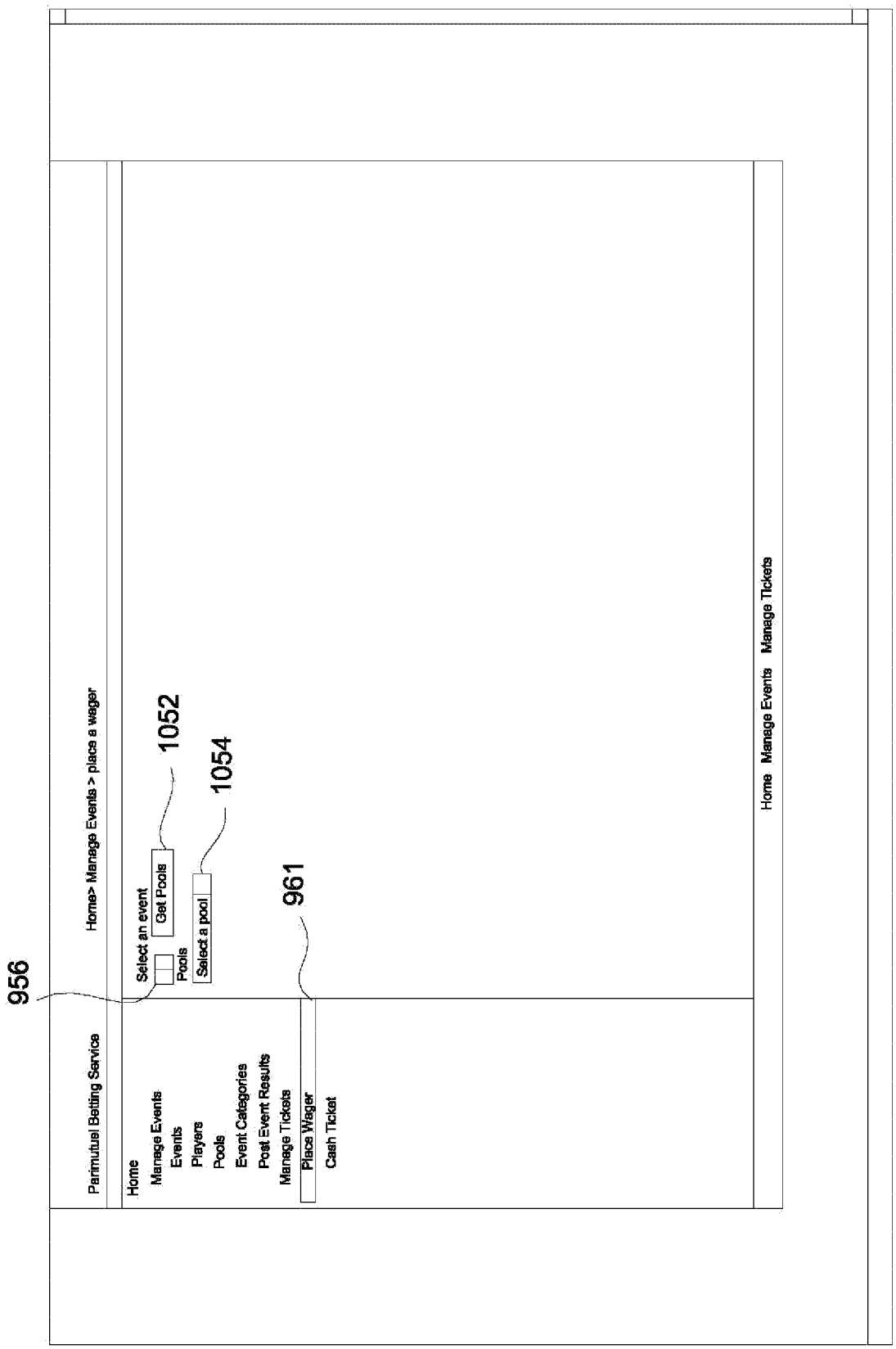
FIG. 9 is a plan view of the wager placement page.

With the pool set and the players set for a particular event, and before the wagering begins, initial player odds are calculated in the player odds object 854. The service will then allow individuals as seen in FIG. 9 to utilize a client side page of the place a wager page 961 for example at a casino location. The web service 950 will receive wager placements from the event location client and the bettor will be able to view the various events by selecting an event at component 956, get the pools for the particular event at 1052, and enable the bettor to choose a particular entrant or series of entrants for wagering on in a particular event or contest within a particular pool type.

During the wagering phase, the player odds object 854 as previously discussed will update the odds for each particular player with the odds object 860. The wager object 902 includes a wager ID object 904 the wager object itself 908, a wager status ID 910 and a payout amount 912. This wager object is reflected in a physical ticket or electronic ticket which the bettor holds to redeem the win. For each particular player, there is a wager detail object 862 which includes the sequence the players placed in the wager sequence object 868. Each particular wager also has a wager status object associated with it 914 which states whether the wager is open or closed and maintains the status object 918.

Figure 8:
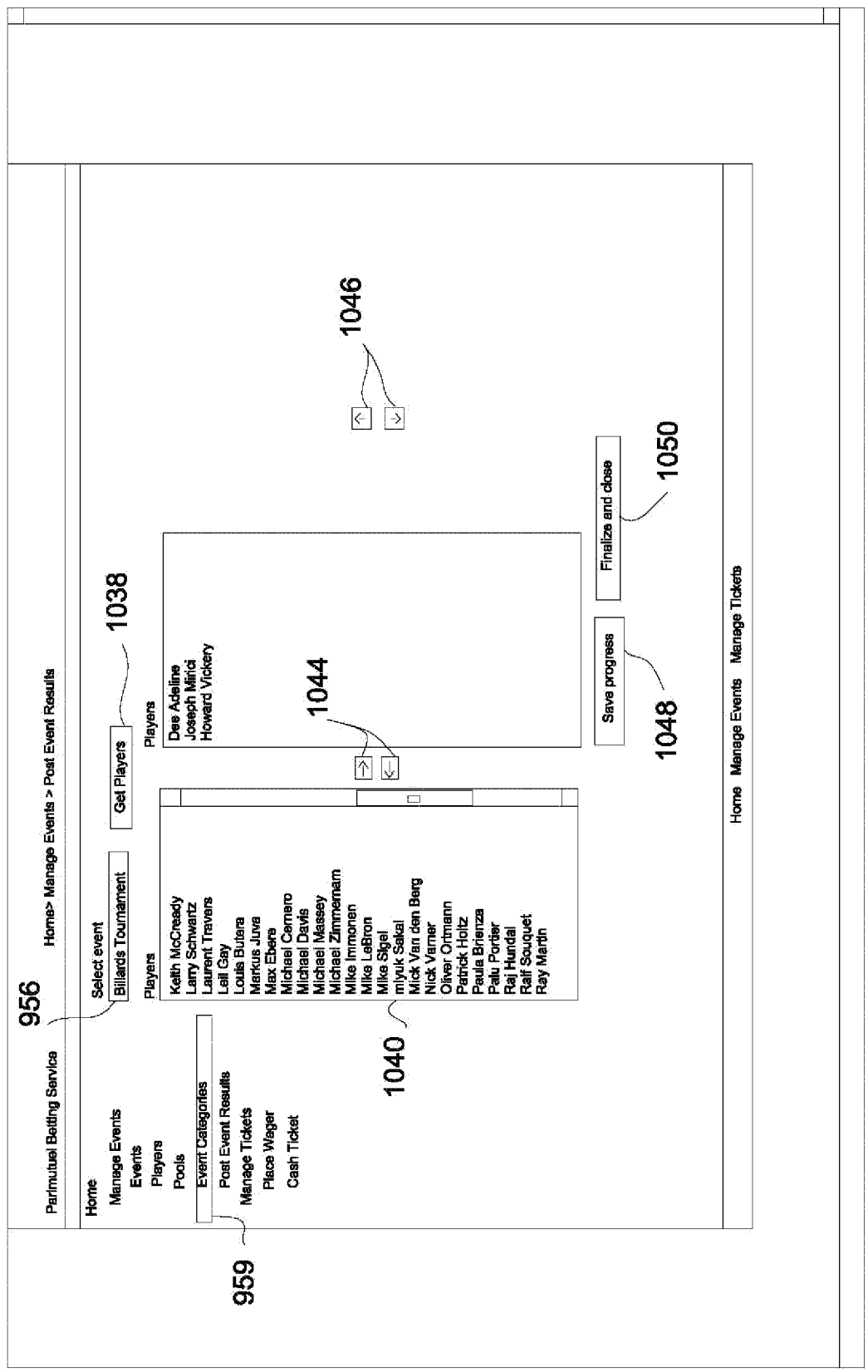
FIG. 8 is a plan view of the posted event results page.

After the wagering is complete the bidding ends and the event is held. After the event or stage has ended, the administrators can either obtain or enter in the post event results page 959 as seen in FIG. 8. Here the administrators can select an event name 956 and get the particular players at 1038. Players are listed in the players' field 1040, and the administrators can utilize selector field arrows 1044 to choose the players who have finished in a particular event and display these players in the finished event field 1042. The players can be ranked and adjusted according to their finishing placements at 1046.

The administrators can save the progress of a particular event if it's still occurring in 1048, and they can also finalize and close the event in 1050. Once the players have or the entrants have finished their play and the particular event is closed, the event finish characteristics field 1 042 dictates the end result of the particular pools which were wagered upon and individuals who did wager, can utilize the cash ticket page 963 to enter in their ticket ID at field 1056 and obtain the payout 1058.

We claim:

1. A system for coordinating a wagering event said system comprising:
    a. a virtual web server comprising an administration application; a server database;
    b. said administration application configured as executable code to generate a first event page utilizing an event category page; said first event page comprising a first set of player elements;
    c. said administration application further configured as executable code to generate a first pool page for management of a first wager pool;
    d. said administration application further configured as executable code to interoperate with a banking application and a casino application, said banking application located at a financial institution, said casino application located at a casino location;
    e. said administration application further configured as executable code to send and receive a wager from said casino application, said wager on a player from said first set of player elements;
    f. said administration application further configured as said executable code to coordinate a wager amount to said banking application and to credit said first pool with said wager amount in a wager ledger.

2. The system according to claim 1 wherein said server database further comprises:
    a. an event object configured to maintain event information from said first event page;
    b. an event category object configured to maintain event category information from said event category page;
    c. a first set of player objects configured to maintain player information from said first set of player elements;
    d. a first pool object configured to maintain pool information from said first pool page.
    e. a wager object configured to maintain wager information from said wager, said wager information comprising said wager amount;
    f. a wager detail component comprising a wager identification component, a player identification component, and a sequence component; said wager detail component configured to record wager detail information into said server database.

3. The system according to claim 2 wherein said server database further comprises:
    a. a wager detail object comprising a wager identification object configured to maintain information from said wager identification component in said server;
    b. a player identification object configured to maintain information from said player identification component in said server database;
    c. a sequence object configured to maintain sequence information from said sequence component in said server database;
    a. said wager detail object configured to maintain said wager detail information from said wager detail component in said server database.

4. The system according to the claim 3 wherein said administration application further comprises:
    a. a pool type component, comprising a win bet or a mandatory pay out;
    b. a player odds component configured to calculate, update, and send to said casino application, odds on a player ID component correlated to a particular pool ID component;
    c. a player odds object configured to maintain information from said player odds component in said server database.

5. The system according to claim 1 wherein said first event page further comprises: an event component comprising an event ID component, an event name component, an event description component, an event location component, an event website component, said event category component, an event start date component, an event end date component, a betting start date component, a betting end date component, an event management component.

6. The system according to claim 5 wherein said event object further comprises:
    d. an event ID object to maintain event ID information of said event ID component;
    a. an event name object configured to maintain event name information from said event name component;
    b. an event description object configured to maintain event description information from said event description component;
    c. an event location object configured to maintain location information from said event location component.

7. The system according to claim 5 wherein said event object further comprises:
    a. an event asset object configured to maintain website information of said event website component;
    b. an event time object configured to maintain time information of said event time component, said event time object comprising an event start date object, an event end date object, a bet start date object, a bet end date object;
    c. an event management object configured to maintain event information of said event management component.

8. The system according to claim 2 wherein said first pool page further comprises: a select event component, a get pools component, a pool title component, a bet type component, a pool type component, a commission component, a pick count component, a maximum wager component, a wager minimum component, a wager maximum component, a flat payout component, a pool status component, a gross total component, a paid-out component, a previous pool component, an update component, an edit pool component.

9. The system according to claim 8 wherein said first pool object further comprises:
    a. a select event object configured to maintain event information of said select event component;

b. a get-pools object configured to maintain pool information of said get-pool component;

c. a pool title object configured to maintain pool information of said pool title component;

d. a bet type object configured to maintain bet type information of said bet type component.

10. The system according to claim 9 wherein said first pool object further comprises:

a. a pool type object configured to maintain pool type information of said pool type component;

b. a commission object configured to maintain commission information of said commission component;

c. a pick counts object configured to maintain pick information of said pick count component;

d. a maximum wagers object configured to maintain maximum wager information of said maximum wagers component.

11. The system according to claim 10 wherein said first pool object further comprises:

a. a wager minimum object, configured to maintain minimum wager information of said wager minimum component;

b. a wager maximum object, configured to maintain maximum wager information of said wager maximum component;

c. a flat payout object configured to maintain payout information of said flat payout component;

d. a gross total object configured to maintain total wager information of said gross total component.

12. The system according to claim 11 wherein said first pool object further comprises:

a. a paid out object configured to maintain paid information of said paid out component;

b. a previous pool object configured to maintain the prior pool information of said previous pool component;

c. an update object configured to update pool information of said update component;

d. and edit pool object configured to edit prior pool information in said edit pool component.

13. A method for coordinating a wagering event including a virtual web server having an administrative application and a server database, said method comprising:

a. creating an event in said server database utilizing said administration application hosted on said virtual web server;

b. displaying said event in a casino application located at a casino location;

c. creating a first set of event players in said administration application from a player page; recording a first set of event players for said event into said server database;

d. creating a first pool in said administration application from a first pool page; recording said first pool in a first pool object in said server database;

e. wagering on said event by sending an open for wagering signal to said casino application from said server database; receiving a first set of wagers from said casino application to said administration application; recording said first set of wagers into said server database; sending a closed for wagering signal from said administration application to said casino application;

f. hosting a casino event at said casino location and sending from said server database to said casino application an event start signal; setting a pending status for said first pool and sending from said administration application to said casino application said pending status; posting results of said casino event from said casino application into said administration application; recording said results of said casino event into said server database; sending from said server database to said casino application an event end signal; setting a closed status for said first pool and sending from said administration application to said casino application said closed status;

g. posting an event results list by sending said event results list from said server database to said casino application;

h. updating said first set of wagers to a win status, a loss status and recording said win status, said loss status, in said server database;

i. sending said win status, said loss status, from said server database to said casino application.

14. The method according to claim 13 wherein said creating an event further comprises: creating an event category in said administration application by accessing an event category page, entering an event category name, and recording said event category name in an event category object located in said server database.

15. The method according to claim 14 wherein said creating an event further comprises: initiating an event page in said administration application; entering an event name in said event page; recording said event name into an event name object located in said server database.

16. The method according to claim 15 wherein said creating an event further comprises: entering an event description in said event page; recording said event description into an event description object located in said server database.

17. The method according to claim 15 wherein said creating an event further comprises: entering an event location in said event page; recording said event location into an event location object located in said server database.

18. The method according to claim 15 wherein said creating an event further comprises: entering an event website into said event page; recording said event website into an event website object located in said server database.

19. The method according to claim 15 wherein said creating an event further comprises: choosing an event category from said server database holding said event category object.

20. The method according to claim 15 wherein said creating an event further comprises: entering an event start/end date and time into said event page; recording said event start/end date and time into an event start/end date and time objects in said server database.

21. The method according to claim 15 wherein said creating an event further comprises: entering a bet start/end date and time into said event page; recording said bet start/end date and time into a bet start/end date and time object located in said server database.

22. The method according to claim 14 wherein said recording a first set of event players further comprises: receiving a casino list of said first set of event players from said casino application; entering said first set of event players into an event player page initialized from said administration application; recording said first set of event players into an event players object in said server database.

23. The method according to claim 14 wherein said creating a first pool further comprises: loading an event from said server database; loading an event from said casino application; recording into said server database a pool title, a bet type, a pool type, a commission, a pick count, a maximum number of wagers, a wagering minimum, a wagering maximum, a flat payout.

24. A system for coordinating a wagering event, said system comprising:

a. means for creating an event in a server database hosted on a virtual web server;

b. means for displaying said event in a casino application located at a casino location;
c. means for recording a first set of event players for said event into said server database;
d. means for recording a first pool in a first pool object in said server database;
e. means for wagering on said event by utilizing means for sending an open for wagering signal to said casino application from said server database; receiving a first set of wagers from said casino application and utilizing means for recording said first set of wagers into said server database; means for sending a closed for wagering signal to said casino application;
f. means for hosting a casino event at said casino location and means for sending from said server database to said casino application an event start signal; means for setting a pending status for said first pool and means for sending to said casino application said pending status; means for recording results of said casino event into said server database; means for sending from said server database to said casino application an event end signal; means for setting a closed status for said first pool and means for sending from said server database to said casino application said closed status;
g. means for posting an event results list by utilizing means for sending said event results list from said server database to said casino application;
h. means for updating said first set of wagers to a win status, a loss status and recording said win status, said loss status, in said server database;
i. means for sending said win status, said loss status, from said server database to said casino application.

25. The system according to claim 24 wherein said means for creating an event further comprises: means for creating an event category by utilizing means for accessing an event category page, entering an event category name, and recording said event category name in an event category object located in said server database.

26. The system according to claim 25 wherein said means for creating an event further comprises: means for initiating an event page; means for entering an event name in said event page; means for recording said event name into an event name object located in said server database.

27. The system according to claim 26 wherein said means for creating an event further comprises: means for entering an event description in said event page; means for recording said event description into an event description object located in said server database.

28. The system according to claim 26 wherein said means for creating an event further comprises: means for entering an event location in said event page; means for recording said event location into an event location object located in said server database.

29. The system according to claim 26 wherein said means for creating an event further comprises: means for entering an event website into said event page; means for recording said event website into an event website object located in said server database.

30. The system according to claim 26 wherein said means for creating an event further comprises: means for choosing an event category from said server database holding said event category object.

31. The system according to claim 26 wherein said means for creating an event further comprises: means for entering an event start/end date and time into said event page; means for recording said event start/end date and time into an event start/end date and time objects in said server database.

32. The system according to claim 26 wherein said creating an event further comprises: means for entering a bet start/end date and time into said event page; means for recording said bet start/end date and time into a bet start/end date and time object located in said server database.

33. The system according to claim 24 wherein said means for recording a first set of event players further comprises: means for receiving a casino list of said first set of event players from said casino application; means for entering said first set of event players into an event player page; means for recording said first set of event players into an event players object in said server database.

34. The system according to claim 24 wherein said means for creating a first pool further comprises: means for loading an event from said server database; means for loading an event from said casino application; means for recording into said server database a pool title, a bet type, a pool type, a commission, a pick count, a maximum number of wagers, a wagering minimum, a wagering maximum, a flat payout.

* * * * *